United States Patent
Storni (10) Patent No.: US 11,730,571 B2
(45) Date of Patent: Aug. 22, 2023

(54) DENTAL TECHNOLOGY KIT

(71) Applicant: RHEIN 83 S.r.l., Bologna (IT)

(72) Inventor: Gianni Storni, Pianoro (IT)

(73) Assignee: RHEIN 83 S.R.L., Bologna (IT)

( * ) Notice: Subject to any disclaimer, the term of this patent is extended or adjusted under 35 U.S.C. 154(b) by 338 days.

(21) Appl. No.: 16/312,559

(22) PCT Filed: Feb. 24, 2017

(86) PCT No.: PCT/IT2017/000035
§ 371 (c)(1),
(2) Date: Dec. 21, 2018

(87) PCT Pub. No.: WO2018/154610
PCT Pub. Date: Aug. 30, 2018

(65) Prior Publication Data
US 2019/0321141 A1  Oct. 24, 2019

(51) Int. Cl.
*A61C 8/00* (2006.01)
*A61C 13/265* (2006.01)
(52) U.S. Cl.
CPC .......... *A61C 8/0062* (2013.01); *A61C 8/0069* (2013.01); *A61C 13/2656* (2013.01); *A61C 8/0066* (2013.01)
(58) Field of Classification Search
CPC ... A61C 8/0062; A61C 8/0066; A61C 8/0069; A61C 13/2656
See application file for complete search history.

(56) References Cited

U.S. PATENT DOCUMENTS 1,422,452 A * 7/1922 Lace .................... A61C 13/225
433/183
4,324,549 A * 4/1982 Madray .............. A61C 13/2656
433/169
(Continued)

FOREIGN PATENT DOCUMENTS

DE   102011081208 A1   2/2013
WO     2015099257 A1   7/2015

OTHER PUBLICATIONS

International Search Report dated Jul. 12, 2017 re: Application No. PCT/IT2017/000035, pp. 1-3, citing: US 9 033 709 B1, WO 2015/099257 A1 and DE 10 2011 0812018 A1.
(Continued)

*Primary Examiner* — Nicholas D Lucchesi
*Assistant Examiner* — Hao D Mai
(74) *Attorney, Agent, or Firm* — Cantor Colburn LLP (57) ABSTRACT

A dental technology kit for coupling a dental prosthesis to a bone tissue includes at least one shell that defines a compartment that can be associated with a protruding head of a pin that can be anchored, directly or indirectly, to the bone tissue. The kit further includes at least one containment unit, which can be stably inserted into a complementarily-shaped recess that can be provided in the prosthesis, and an intermediate container defining internally a receptacle of shape at least partially complementary to the shell. The container is accommodatable in an at least partially complementarily-shaped chamber provided in the containment unit until a mating configuration is defined, in which at least one curved surface hump of the container, accommodated in the chamber, is arranged in contact with at least one complementarily-shaped curved surface region of the unit.

14 Claims, 8 Drawing Sheets

(56) References Cited

U.S. PATENT DOCUMENTS

| | | | | |
|---|---|---|---|---|
| 4,488,874 A * | 12/1984 | Soifer | .................. | A61C 8/0048 |
| | | | | 433/173 |
| 4,957,438 A * | 9/1990 | Bax | .................... | A61C 13/2656 |
| | | | | 433/177 |
| 4,993,950 A * | 2/1991 | Mensor, Jr. | .......... | A61C 8/0048 |
| | | | | 433/173 |
| 5,030,094 A * | 7/1991 | Nardi | ................... | A61C 13/30 |
| | | | | 433/169 |
| 5,098,295 A * | 3/1992 | Durr | .................... | A61C 8/0048 |
| | | | | 433/172 |
| 5,417,570 A * | 5/1995 | Zuest | ................... | A61C 8/0048 |
| | | | | 433/172 |
| 5,871,357 A * | 2/1999 | Tseng | ................... | A61C 13/235 |
| | | | | 433/177 |
| 6,030,219 A * | 2/2000 | Zuest | ................... | A61C 8/0048 |
| | | | | 433/172 |
| 6,203,325 B1 * | 3/2001 | Honkura | .............. | A61C 13/235 |
| | | | | 433/177 |
| 6,299,447 B1 * | 10/2001 | Zuest | ................... | A61C 8/0048 |
| | | | | 433/172 |
| 6,981,871 B2 * | 1/2006 | Mullaly | ............... | A61C 8/0048 |
| | | | | 433/172 |
| 8,033,826 B2 * | 10/2011 | Towse | ................... | A61C 8/005 |
| | | | | 433/172 |
| 8,043,089 B2 * | 10/2011 | Bulard | .................. | A61C 8/005 |
| | | | | 433/173 |
| 8,257,081 B2 * | 9/2012 | Honkura | .............. | A61C 13/235 |
| | | | | 433/189 |
| 8,512,039 B2 * | 8/2013 | Mullaly | ............... | A61C 8/0018 |
| | | | | 433/172 |
| 9,033,709 B1 | 5/2015 | Allen et al. | | |
| 9,452,030 B2 * | 9/2016 | Allen | ................... | A61C 8/0053 |
| 9,468,506 B2 * | 10/2016 | Brun | .................... | A61C 8/0089 |
| 10,682,210 B1 * | 6/2020 | LaMar | ..................... | A61C 1/08 |
| 2002/0177103 A1 * | 11/2002 | Pelak | ................... | A61C 8/0048 |
| | | | | 433/173 |
| 2006/0014120 A1 * | 1/2006 | Sapian | ................ | A61C 8/0065 |
| | | | | 433/173 |
| 2010/0055645 A1 * | 3/2010 | Mullaly | ............ | A61C 13/2656 |
| | | | | 433/215 |
| 2013/0101960 A1 * | 4/2013 | Fischler | ................ | B25B 27/00 |
| | | | | 433/173 |

OTHER PUBLICATIONS

Written Opinion dated Jul. 12, 2017 re: Application No. PCT/IT2017/000035, pp. 1-5, citing: US 9 033 709 B1, WO 2015/099257 A1 and DE 10 2011 0812018 A1.

* cited by examiner

DENTAL TECHNOLOGY KIT

TECHNICAL FIELD

The present disclosure relates to a dental technology kit.

BACKGROUND

As is known, dental technology is the set of activities for supporting dental surgery, and which are specifically dedicated to the construction of dental prostheses.

In such context, the types of prostheses usually made are varied, and can for example differ in the number of teeth they replicate. Prostheses exist in fact which replicate a single missing tooth, and it is not unusual for them to substitute entire dental arches, or at least a part of them.

To couple all the above-mentioned prosthetic elements to the mouth of the patient, it is possible to use implantology techniques, by way of which they are anchored to one or more pins (or implants) previously inserted into a maxillary bone and/or mandible bone, after awaiting their osseointegration (in order to ensure the stable fixing of the pin to the bone).

Likewise, if the root of the lost tooth has at least partially survived, it is possible to use natural dentition techniques, in which the pins are inserted directly into the root.

Both of the above techniques in any case require that each pin be inserted almost completely into the gums and into the bone, and left protruding into the mouth with an enlarged end head.

At the end of the osseointegration process, the head can then be accommodated in a complementarily-shaped cap, which in turn is intended to be accommodated in a recess defined by a containment shell, which is previously embedded in the prosthesis (taking care obviously to keep the recess open outward).

More precisely, after having inserted the cap into the recess, the rigid anchoring of the prosthesis to the maxillary bone or mandible bone is achieved by pressing the latter against the pin (or the pins), so as to force the insertion of the head of the pin into the cap.

Such techniques are however not devoid of drawbacks, which arise especially (but not only) when the prosthesis is anchored to two or more pins.

In these cases in fact, correct coupling occurs when the pins are arranged in the respective maxillary bone or mandible bone mutually in parallel, in alignment with the ideal direction of insertion, which usually coincides with the perpendicular to the occlusal plane.

Conversely, various difficulties are often encountered in arranging the various pins or dental implants in the correct orientation, and when a misalignment occurs, it is necessary to exert considerable pressure in order to insert the heads into the caps, thus obtaining however a forced mating that causes trauma and which in any case causes the onset of stresses on the pins proper, which, precisely because of the rigidity of the coupling, deforms the pins themselves and/or the elements of the prosthesis, with further unwanted consequences.

Another drawback arises when the prosthesis is to be anchored to a single pair of pins (for example, which are inserted at the missing roots of two incisors or of two canines, now lost).

In such context, during mastication the prosthesis, which is U-shaped, sometimes tends to act as a lever and therefore to rotate about the heads of the pins, which act as fulcrums.

Owing to the rigidity of the coupling, the caps are not able to compensate for the stresses to which they are subjected, and the risk is run of the entire prosthesis being unseated from the pins, or of the components involved undergoing permanent damage or deformations.

More generically, it finally needs to be noted that while awaiting completion of the osseointegration, therefore before anchoring the prosthesis to the maxillary bone or mandible bone, the patient has to live with one or more foreign objects (the heads of the pins) which protrude significantly from his/her gums, causing bothersome situations.

SUMMARY

The aim of the present disclosure is to solve the above mentioned problems, by providing a dental technology kit that ensures an optimal anchoring of a prosthetic element to one or more pins.

Within this aim, the disclosure provides a dental technology kit that makes it possible to fix a prosthesis in the mouth of a patient, without causing trauma or discomfort to the patient.

The disclosure also provides a kit that is reliable, which ensures an optimal anchoring of a prosthetic element even in the event of failed mutual alignment of the pins.

The disclosure further provides a kit that is capable of containing the discomfort of the patient, during the preliminary process of osseointegration of the pins.

The disclosure anchors a prosthetic element while ensuring a high capacity to withstand stresses, during anchoring and in normal use.

The disclosure also provides a kit that adopts an alternative technical and structural architecture to those of conventional kits.

The disclosure further provides a kit that can be easily implemented using elements and materials that are readily available on the market.

The disclosure provides a kit that is low cost and safely applied.

This aim and these and other advantages which will become better apparent hereinafter are achieved by providing a dental technology kit, for coupling a dental prosthesis to a bone tissue, which comprises at least one shell that defines a compartment that can be associated with a protruding head of a pin that can be anchored, directly or indirectly, to the bone tissue, and at least one containment unit, which can be stably inserted into a complementarily-shaped recess that can be provided in the prosthesis, characterized in that it comprises an intermediate container, which defines internally a receptacle of shape at least partially complementary to said shell, said container being accommodatable in an at least partially complementarily-shaped chamber provided in said containment unit until a mating configuration is defined, in said mating configuration at least one curved surface hump of said container, accommodated in said chamber, being arranged in contact with at least one complementarily-shaped curved surface region of said unit, in order to define, at least in said mating configuration, a spherical mating between said container and said unit.

BRIEF DESCRIPTION OF THE DRAWINGS

Further characteristics and advantages of the disclosure will become better apparent from the description of a preferred, but not exclusive, embodiment of the kit according to the disclosure, which is illustrated by way of non-limiting example in the accompanying drawings wherein.

DETAILED DESCRIPTION OF THE DRAWINGS

With particular reference to FIGS. 1-15, the reference numeral 1 generally designates a dental technology kit, with which, according to the methods that will be described in detail below, it is possible to obtain the coupling of a dental prosthesis to a bone tissue.

Such bone tissue can belong to the maxillary bone or to the mandible bone of a patient who, as a consequence of trauma or diseases of various types, needs to have a dental prosthesis implanted his/her their mouth.

The prosthesis, which can be included in the kit 1 or be made/supplied separately (and which is not shown for the sake of simplicity in the accompanying figures), can be of any type, and therefore a simple dental crown, a dental implant, or a dental bridge, in order to substitute one or more missing teeth, and can be fixed or removable.

The kit 1 comprises at least one shell 2, which defines a compartment 2a (FIG. 2) that can be associated with a protruding head 3a of a pin 3 (the head 3a can be inserted by elastic forcing into the compartment 2a, the shape of which is at least partially complementary to the head 3a).

In turn, the pin 3 can (previously) be anchored to the bone tissue, directly or indirectly.

In more detail, it should be noted that the kit 1 can be effectively used in the application of implantology techniques, with the pin 3 in this case substantially being a dental implant to be inserted into the bone tissue of the patient (or into the surrounding body tissues), at the lost root of the tooth, where it is rendered integral, by osseointegration, directly with the bone tissue proper.

Likewise, the kit 1 can be validly applied in the implementation of natural dentition techniques, in which at least some of the root of the tooth has survived in the mouth of the patient, and in this case the pin 3 (of root type) is coupled indirectly to the bone tissue, in that it is inserted into the root of the lost tooth, and rendered integral with it.

It should likewise be noted that the shell 2 is associated with the protruding head 3a of a pin 3 directly inserted into the bone tissue or, as in the accompanying figures, with a pin 3 provided with an external threading 3b, designed to engage with a female thread provided in a pre-graft which in turn is adapted for stable coupling with the surrounding bone tissues. Such pre-graft can have an internal accommodation (the female thread) for the pin 3 and can include a previous procedure by the dentist.

In any case it should be observed that the possibility is not ruled out of using the kit 1 in other contexts and for other body tissues as well, according to the specific requirements.

The kit 1 also comprises at least one containment unit 4 (shown in FIGS. 10 and 11), which can be stably inserted in a complementarily-shaped recess that can be provided in the prosthesis. For example, the containment unit 4 can be inserted into the recess and made integral with it by previously spreading an adhesive or adapted resin in the recess proper, but the same result can also be obtained differently, while remaining within the scope of protection claimed herein.

As will be better described below, after having applied the shell 2 on the head 3a of the pin 3 (already inserted into the bone tissue), and having inserted the containment unit 4 into the recess of the prosthetic element, the unit 4 is indirectly associated with the shell 2, so as to provide the desired coupling between the prosthetic element and the bone tissue.

According to the disclosure, the kit 1 comprises an intermediate container 5 (shown in FIGS. 7, 8 and 9), which internally defines a receptacle 5a (clearly visible for example in FIGS. 2, 8 and 9) of shape at least partially complementary to the shell 2.

The container 5 can be accommodated in an at least partially complementarily-shaped chamber 4a (FIG. 2 and FIG. 11), which is provided in the containment unit 4, until a mating configuration is defined (FIGS. 3 to 6 for example).

In such mating configuration, at least one curved surface hump of the container 5, accommodated in the chamber 4a, is arranged in contact with at least one complementarily-shaped curved surface region of the unit 4.

Thus, by virtue of the curved surface hump resting on the curved surface region, at least in the mating configuration a spherical mating is defined between the container 5 and the unit 4.

Once shape mating has occurred between the unit 4 and the container 5, the spherical mating thus ensures the possibility of relative rotation between the unit 4 (and the prosthesis with which the latter was previously made integral) and the intermediate container 5, thus making it possible to obtain a plurality of mutual spatial orientations, some of which are shown in FIGS. 3 to 6.

In particular, in the embodiment illustrated in the accompanying figures, for the purposes of non-limiting example of application of the disclosure, the curved surface hump of the container 5 is constituted by at least one portion 5b of a spherical cap. In this regard, it should be noted that the superficial hump can be constituted by a complete cap or by a portion 5b of a cap, flattened at its top, as in the accompanying figures.

In any case, in the mating configuration (and with further reference to the solution proposed purely for the purposes of example in the accompanying figures) such portion 5b of a cap (or the entire cap) is arranged in contact with a complementarily-shaped recess 4b, which is internally defined by the containment unit 4 and which constitutes the cited curved surface region (which is intended to form, with the portion 5b, the spherical mating) The portion 5b effectively is accommodated, with the ability to rotate, in the recess 4b.

It should be noted that the kit 1 can be sold in a version that comprises a number at will of shells 2, containment units 4 and intermediate containers 5 (and optionally other accessories), with the pins 3 being obtained separately (or pins already present in the mouth of the patient can be used, for example if they were implanted in a previous procedure).

In another implementation of the disclosure, the kit 1 also comprises at least one pin 3 (and optionally a plurality of pins 3). As can also be seen from the figures, each pin 3 is therefore substantially constituted by an elongated shank (along which the threading 3b can be provided), which can be anchored directly or indirectly to the bone tissue (according to the methods described in the preceding pages).

The pin 3 therefore defines, with an end hump thereof, the protruding head 3a, which has a shape that complements the compartment 2a, so as to easily be able to achieve, by elastic forcing, the accommodation of the head 3a in the compartment 2a and thus prepare the pin 3 for mating with the container 5, the unit 4 and therefore the prosthesis.

More specifically, in an embodiment of significant practical interest, illustrated in the accompanying figures for the purposes of non-limiting example of application of the disclosure, the head 3a is shaped like an equatorial region of a sphere.

While not ruling out giving the head 3a different shape structures, while remaining within the scope of protection claimed herein, it should be noted that the choice described earlier makes it possible to significantly contain the space occupation of the head 3a (which as has been seen is designed to protrude into the mouth, outside the gums), while still keeping a shape that ensures an effective shape mating with the compartment 2a (chosen to be complementarily shaped) of the shell 2, while still leaving, as will be better explained below, the possibility of rotation of the shell 2 with respect to the pin 3.

Containment of the space occupation reduces or even cancels out the discomfort caused to the patient in the step of osseointegration of the pins 3 (before completing the installation of the prosthesis), or when, more simply, the prosthesis is temporarily removed for cleaning and/or maintenance.

In the embodiment shown purely for the purposes of example in the accompanying figures, the intermediate container 5 is constituted substantially by a rounded tubular body 5c, which is closed at one end by a respective end face 5d.

In such context therefore, it is the end face 5d that, together with the inner surface of the body 5c, delimits the receptacle 5a that is designed to receive the shell 2. Furthermore, the cited portion 5b of a spherical cap extends coaxially from the end face 5d, on the opposite side with respect to the receptacle 5a.

The spherical mating that is therefore defined allows the relative rotation about a center that coincides with the ideal center of the spherical cap.

Advantageously, the kit 1 according to the disclosure can comprise means of arresting the relative rotation, usually permitted by the spherical mating, between the containment unit 4 and the intermediate container 5.

While in fact, as has been seen, in the mating configuration usually the containment unit 4 can rotate with respect to the intermediate container 5 (about a center of rotation constituted by the center of the spherical cap), the means of arrest are automatically activatable, at least at the mating configuration, upon reaching of a predefined limit value of inclination a assumed by the unit 4 (and by the prosthesis) with respect to the container 5 (and to the shell 2 and to the pin 3), or vice versa.

Figure 1:
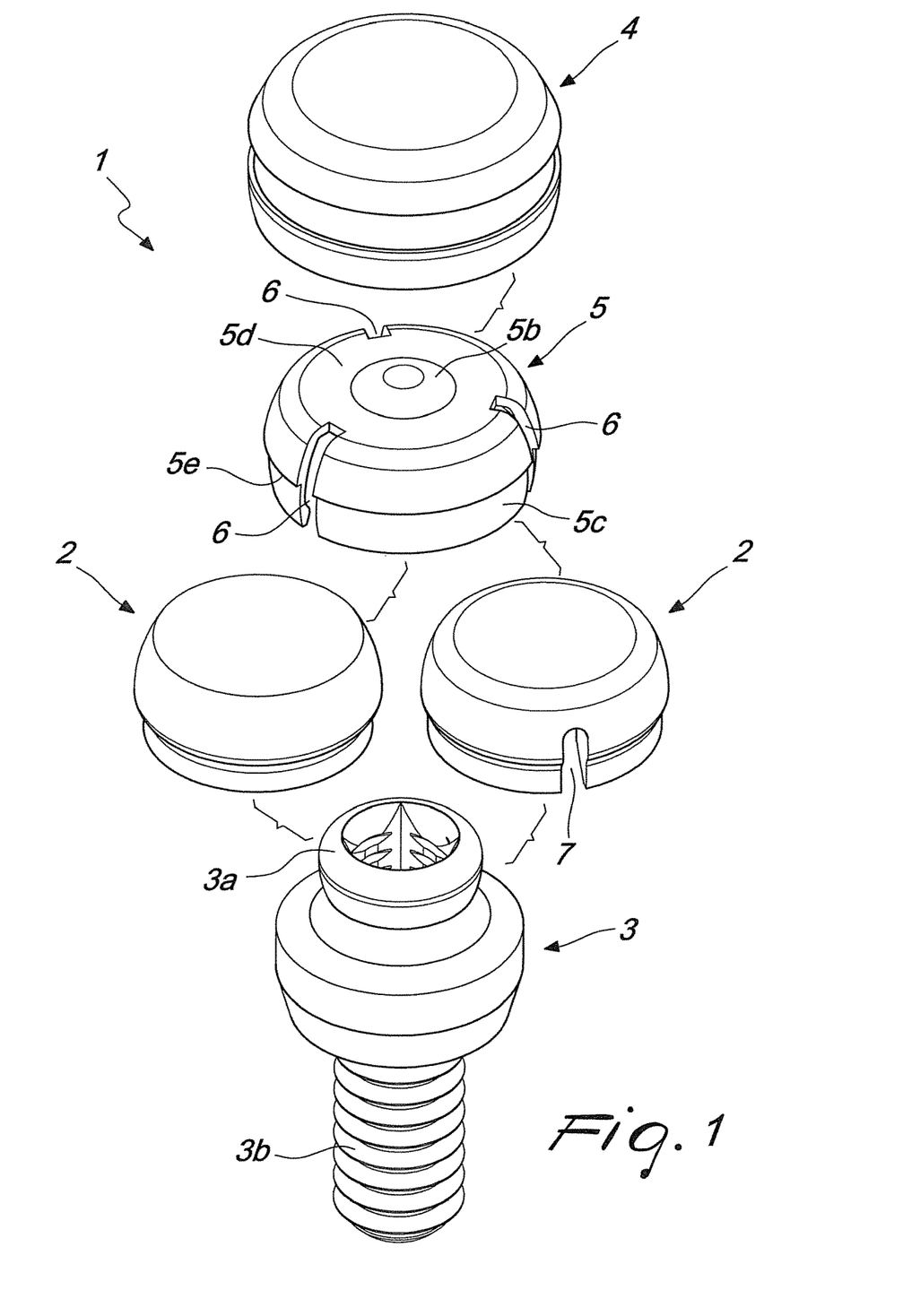
FIG. 1 is a perspective view of the components of the kit for coupling according to the disclosure.
Figure 2:
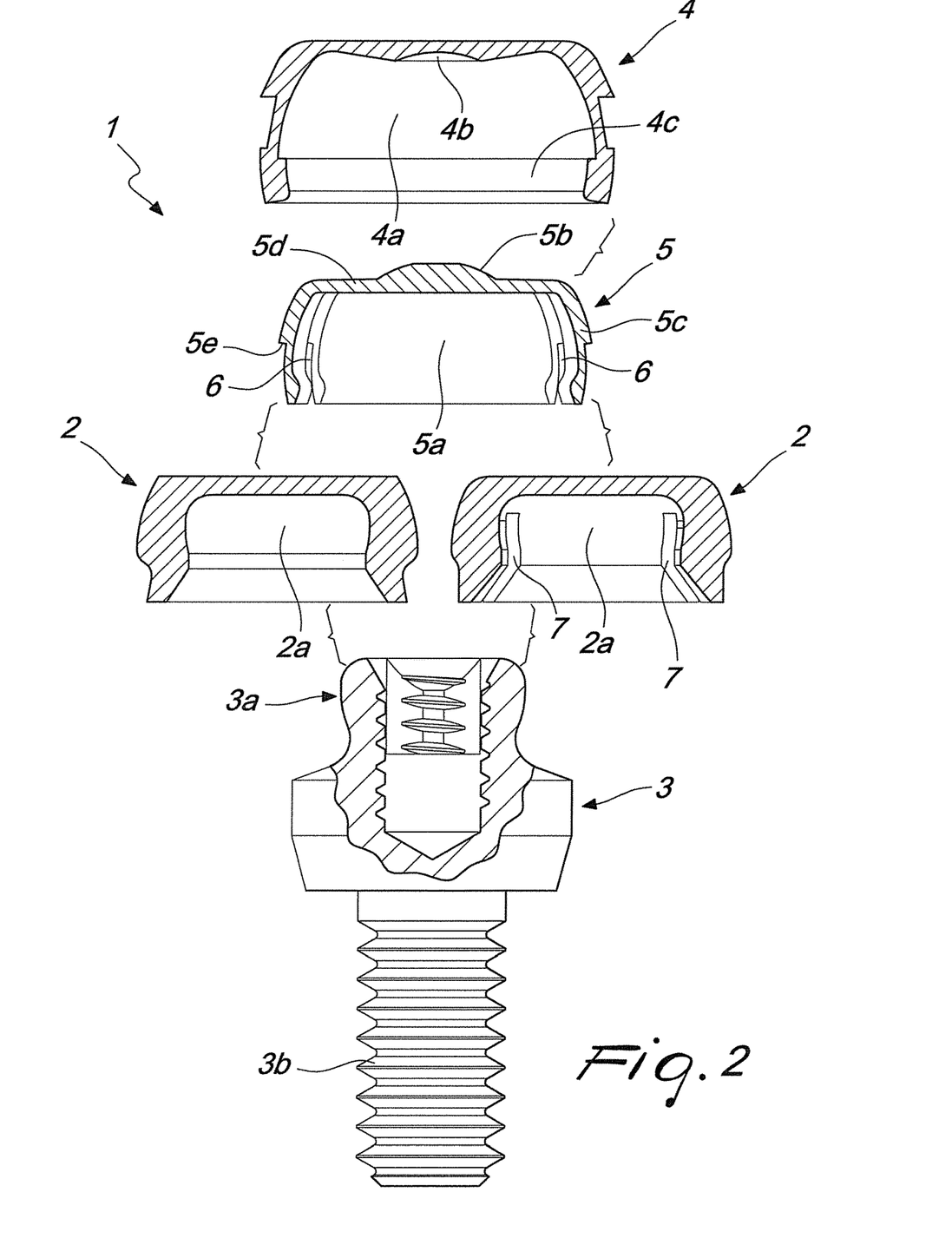
FIG. 2 is a cross-sectional view taken along an axial plane of the components of the kit of FIG. 1.
Figure 3:
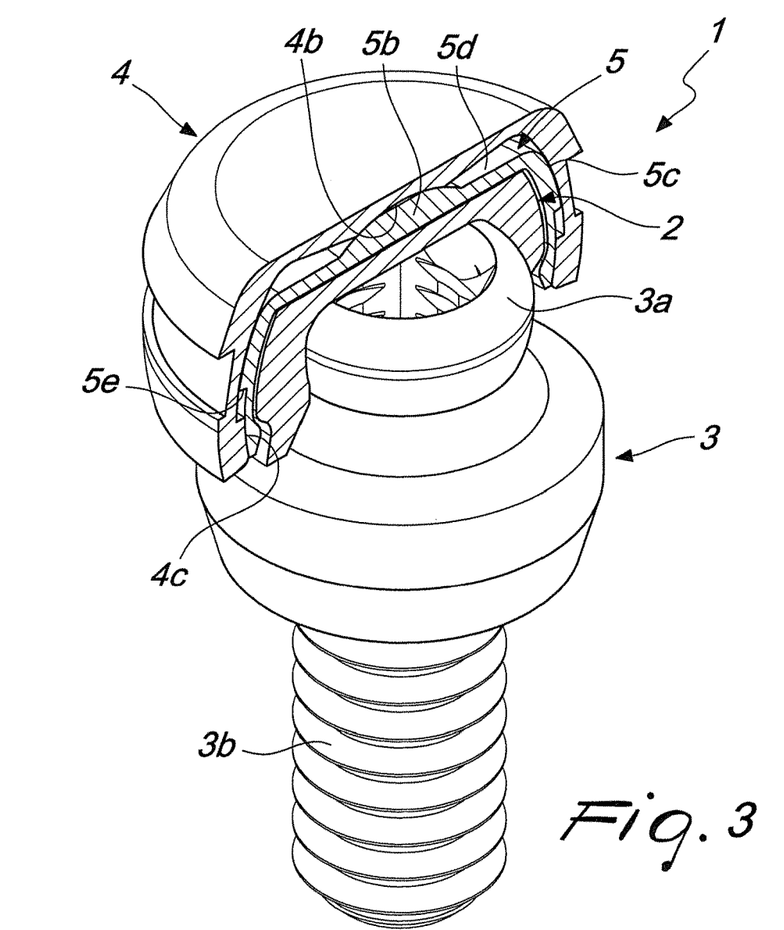
FIGS. 3 and 4 are partially cutaway perspective views of the use of the kit of FIG. 1, in a first and in a second position of the containment unit.
Figure 4:
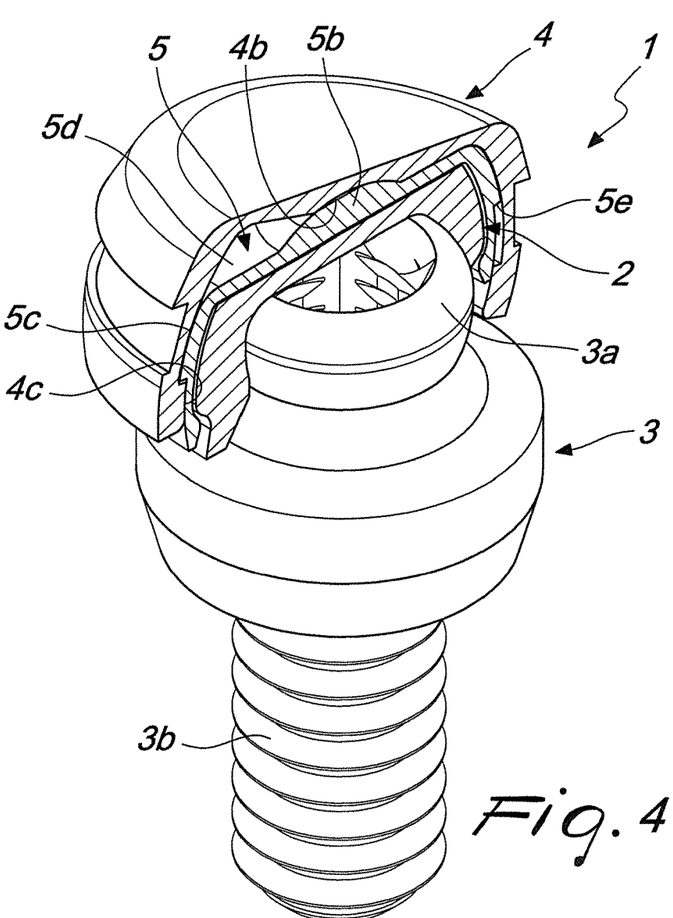
Figure 5:
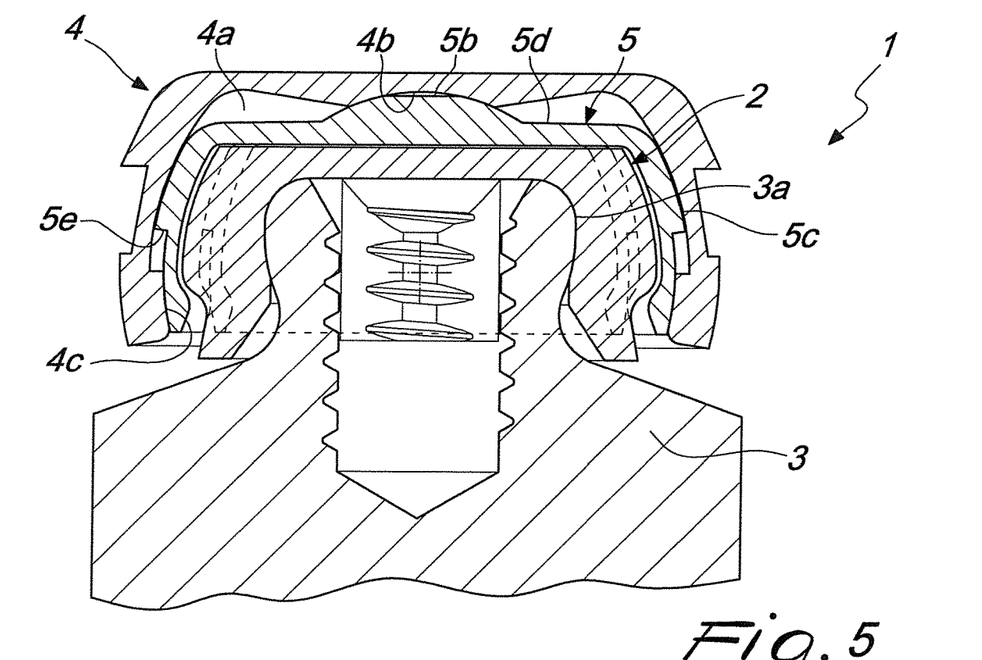
FIG. 5 is a cross-sectional view taken along an axial plane of the kit, with the containment unit in the arrangement of FIG. 3.
Figure 6:
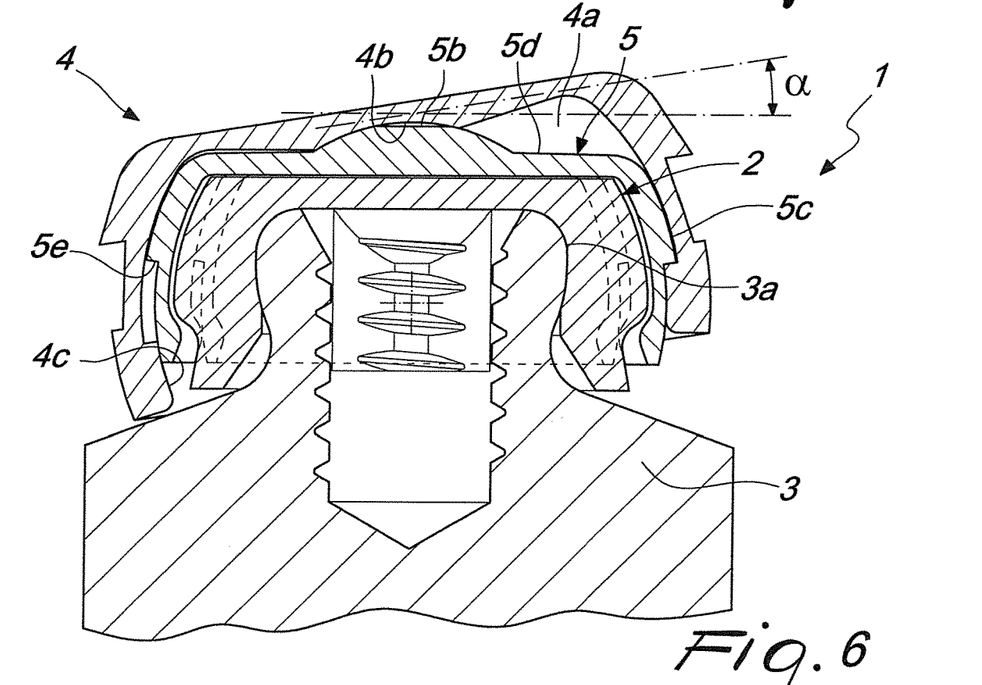
FIG. 6 is a cross-sectional view taken along an axial plane of the kit with the containment unit in a third position of the containment unit.
Figures 7, 8:
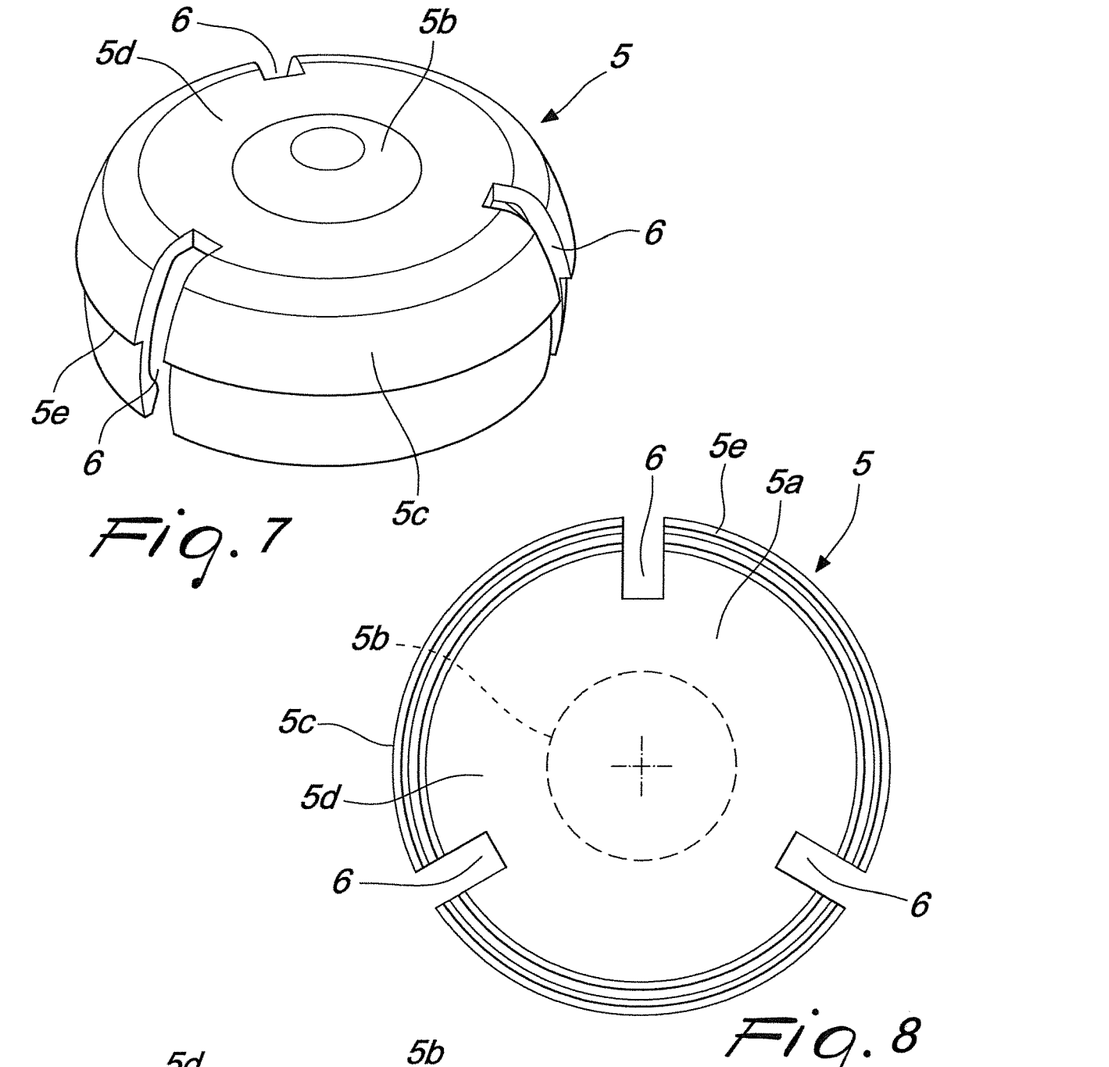
FIG. 7 is a perspective view of the intermediate container.
FIG. 8 is a view from below of the container of FIG. 7.
Figure 9:
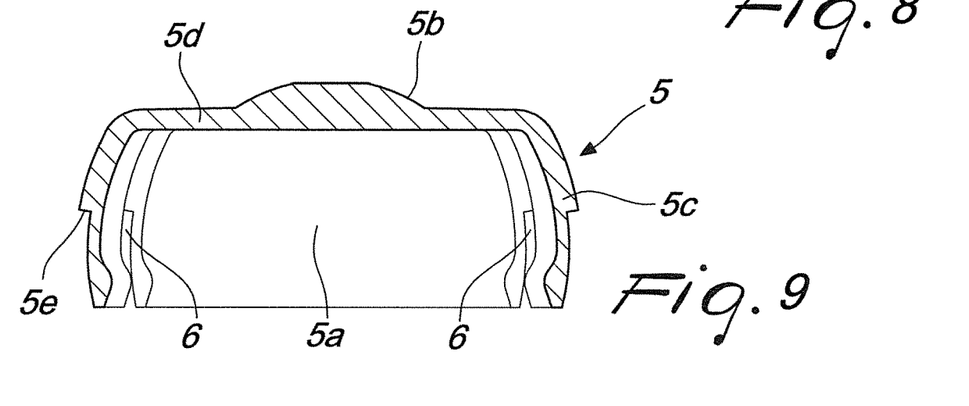
FIG. 9 is a cross-sectional view taken along an axial plane of the container of FIG. 7.
Figure 10:
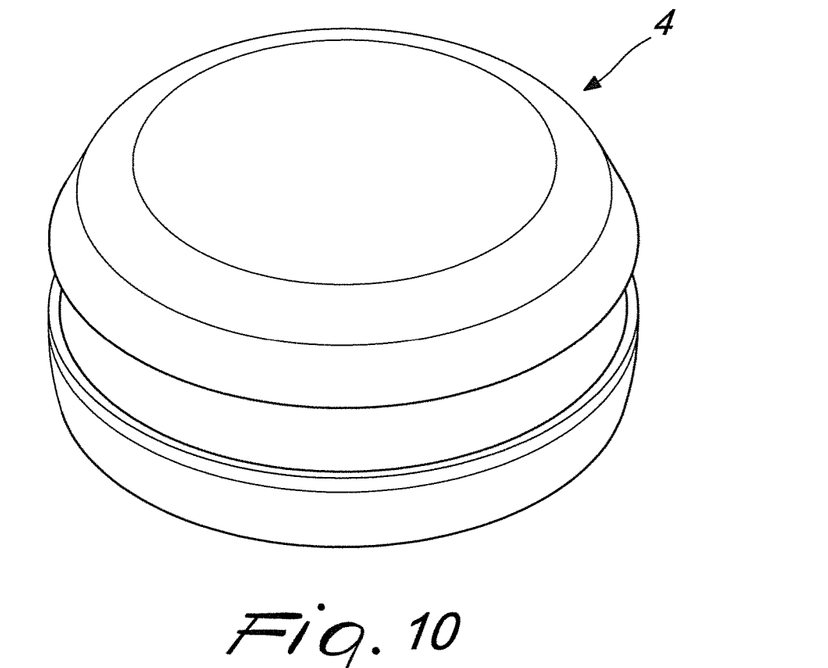
FIG. 10 is a perspective view of the containment unit.
Figure 11:
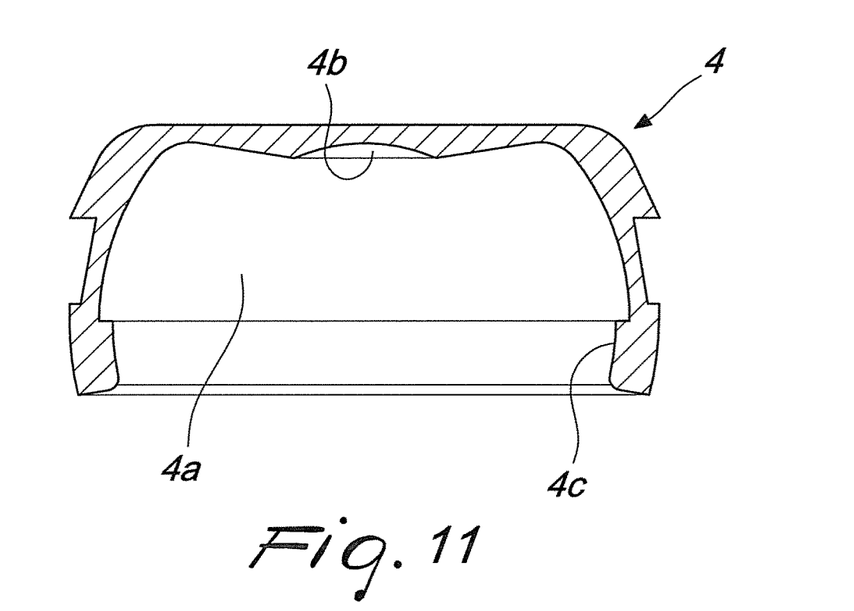
FIG. 11 is a cross-sectional view taken along an axial plane of the unit of FIG. 10.

Such limit value can be chosen at will and for example can be equal to a few degrees (as in the accompanying figures, and in particular in FIG. 6, which shows the condition of reaching such limit value).

In particular, in a possible embodiment, proposed for the purposes of example in the accompanying figures, the means of arrest comprise a circumferential ridge 4c, which protrudes internally from the side wall of the containment unit 4, such wall delimiting the chamber 4a.

In the mating configuration, and when the limit value is reached, a portion of a shoulder 5e provided externally on the intermediate container 5 (on the tubular body 5c) is brought to rest on a corresponding part of the ridge 4c, so as to determine the automatic arrest of the relative rotation between the containment unit 4 and the intermediate container 5.

It should be noted that, as is evident from the foregoing description and from the accompanying figures, the relative rotation between the unit 4 and the container 5 can occur according to any radial direction, and therefore, upon reaching the limit value, the part of the ridge 4c and the portion of the shoulder 5e that are brought into mutual contact vary in each instance, in order to produce the arrest of the rotation.

Conveniently, the tubular body 5c is crossed by at least one through longitudinal slot 6, which makes it possible to increase the elastic deformability of the intermediate container 5 (and therefore favor its insertion into the unit 4 and, likewise, the insertion of the shell 2 into the receptacle 5a).

Advantageously, the shell 2 is crossed by at least one longitudinal split 7 that, like the slot 6, makes it possible to increase the elastic deformability of the shell 2 proper. This evidently favors an optimal coupling between the shell 2 and the head 3a of the pin 3 (and/or the insertion of the shell 2 into the receptacle 5a).

More specifically, the body 5c and the shell 2 can respectively have a plurality of slots 6 and/or splits 7, substantially equally distributed, just as the possibility is not ruled out of providing, in the same kit 1, some bodies 5c and shells 2 without slots 6 and splits 7, and others provided with such elements, also in varying numbers.

Positively, in an embodiment of significant practical interest, which does not limit the application of the disclosure, the shell 2 and the intermediate container 5 are made of a material chosen from between a biocompatible metallic material (titanium for example) and a polymeric material.

If a polymeric material is used, the shell 2 (optionally with the splits 7) and/or the container 5 can be (preferably but not exclusively) made by molding.

Although also possible in other contexts, the splits 7 are found to be of particular interest when the shell 2 is made of polyether ether ketone (a polymeric material also known as PEEK), which has high mechanical properties and for which (preferably) elastic deformability is increased with the splits 7.

Even with the splits 7, however, the high mechanical rigidity conferred by such material on the shell 2 makes such solution particularly (but not exclusively) indicated for fixed prostheses, i.e. prostheses that, once installed in the mouth of the patient, will be removed only by a dentist.

With further reference to an embodiment of significant practical interest, which does not limit the application of the disclosure, the pin 3 and the containment unit 4 are made of a biocompatible metallic material, such as for example titanium.

Figure 12:
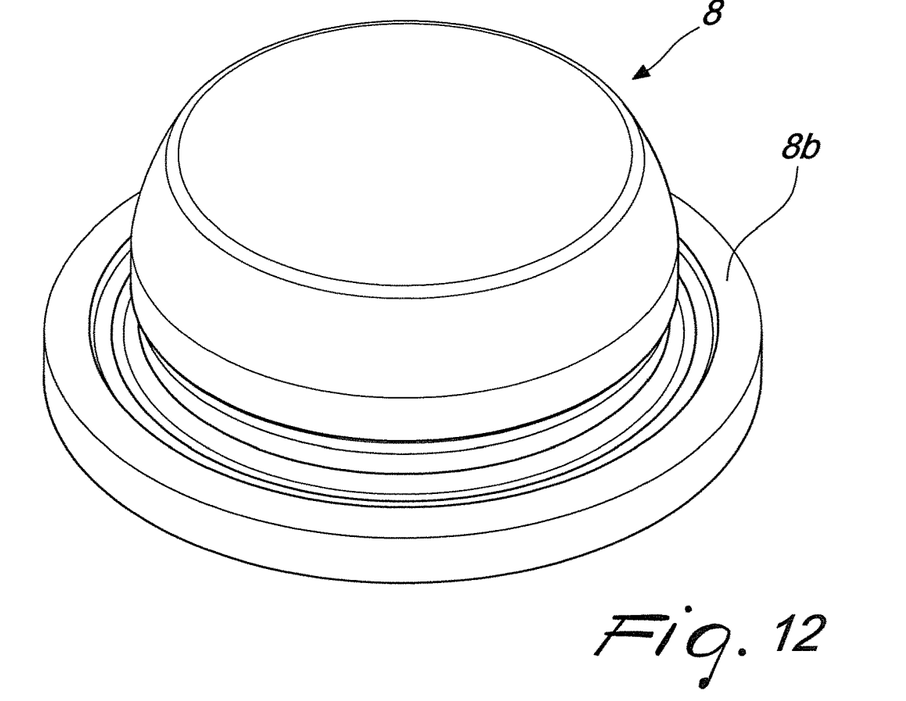
FIGS. 12 and 13 are perspective views of two further components of the kit according to the disclosure.
Figure 13:
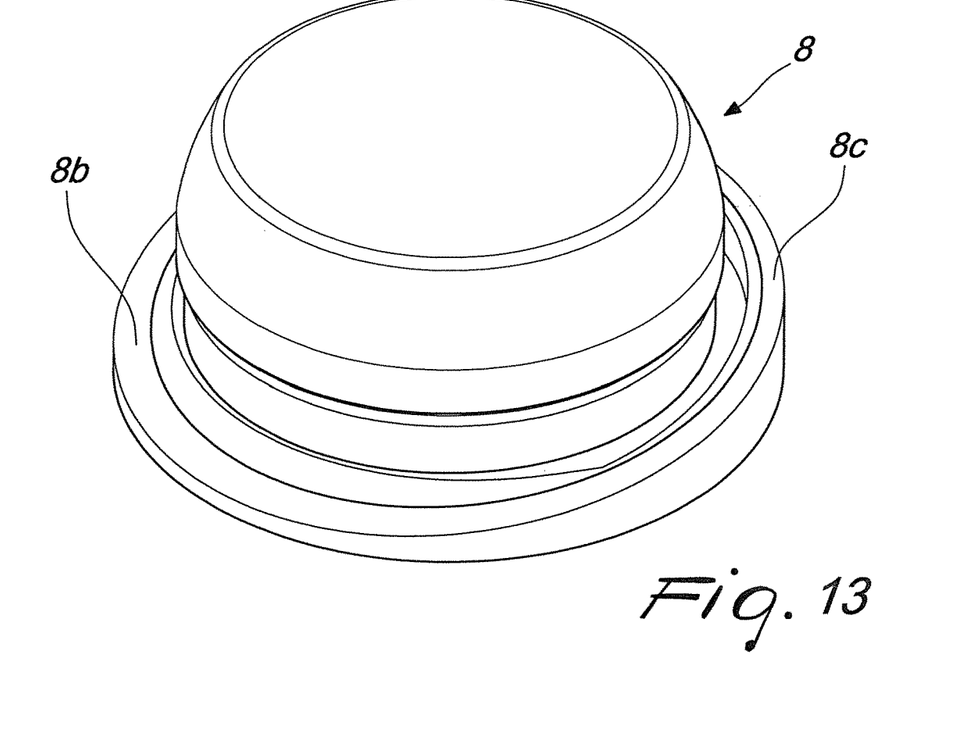
Figure 14:
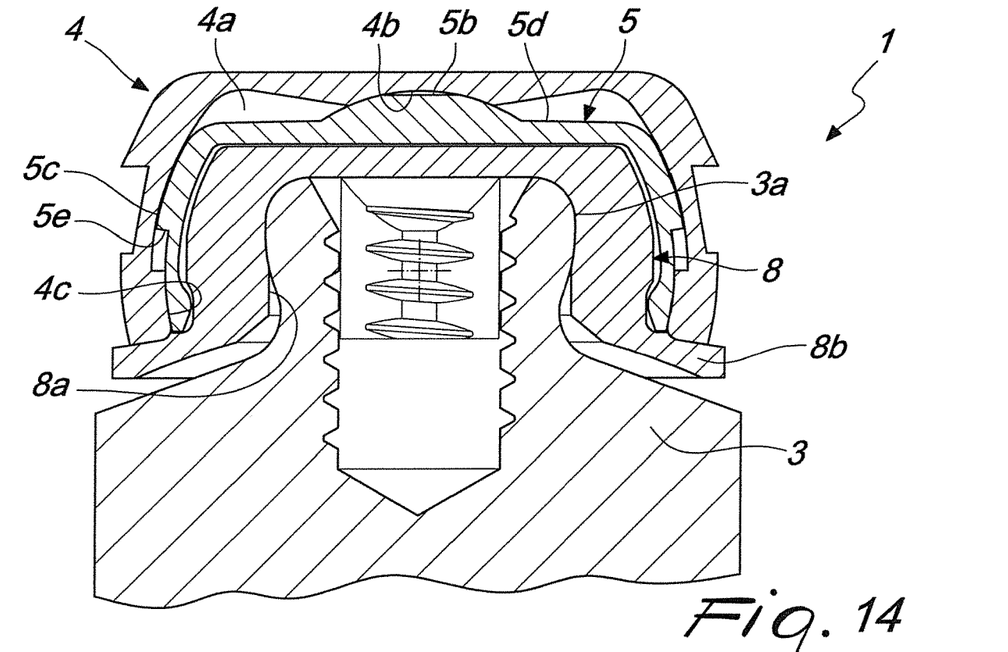
FIG. 14 is a cross-sectional view taken along an axial plane showing the use of the component of FIG. 12.
Figure 15:
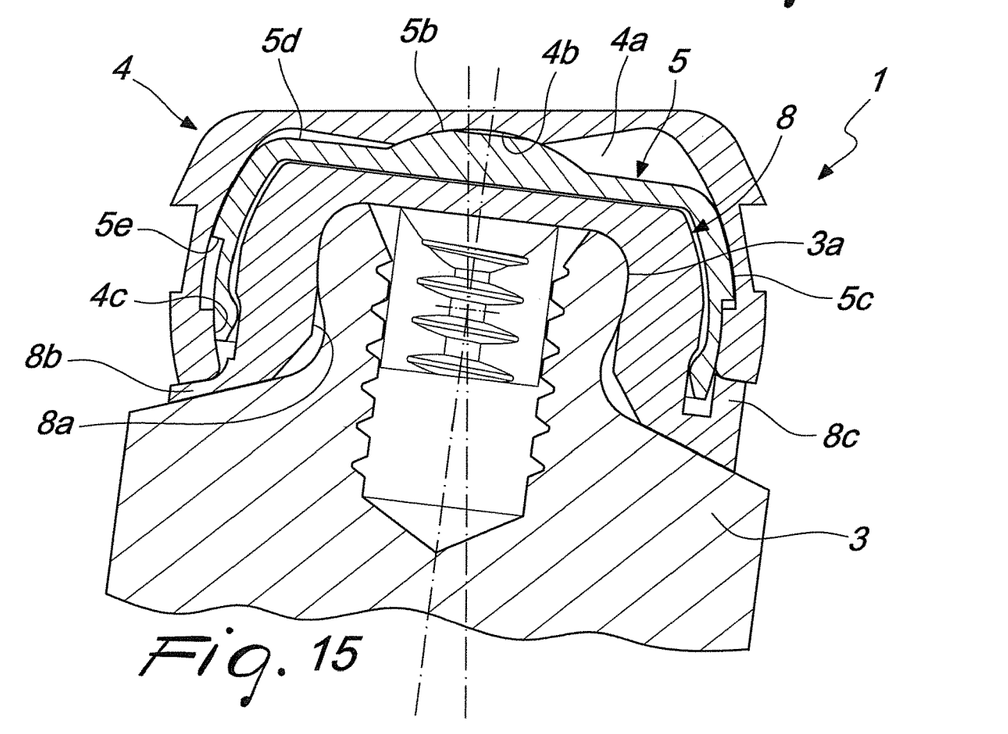
FIG. 15 is a cross-sectional view taken along an axial plane showing the use of the component of FIG. 13.

Conveniently, the kit 1 comprises at least one cap 8 (FIGS. 12 and 13 show two possible embodiments thereof), which substantially replicates the shape structure of the shell 2 and which in turn is provided internally with a respective cavity 8a, which substantially replicates the shape structure of the compartment 2a.

The cap 8 can thus be temporarily associated with the pin 3 (by being mounted on its head 3a in the same way in which the shell 2 will subsequently be mounted) and with the intermediate container 5 (by being inserted into the receptacle 5a), taking care at the same time to accommodate the intermediate container 5 in the chamber 4a of the containment unit 4.

More precisely, such activity can be carried out during the preliminary step of stable insertion of the containment unit 4 into the complementarily-shaped recess that can be provided in the prosthesis.

As has been seen in fact, the unit 4 can be rendered integral with the prostheses by inserting it into a recess inside which a resin or adhesive has previously been spread: insertion of the unit 4 can be done by pushing the prosthesis against the pins 3, on which the caps 8, the units 4, and the containers 5 have been previously arranged, in order to then wait for the resin/adhesive to take effect.

In such context, the cap 8 provisionally keeps the units 4 and the containers 5 in the nominal position and is subsequently removed, in order to allow the subsequent steps and the use of the shell 2.

Conveniently, the cap 8 has an ancillary circumferential flange 8b, which protrudes externally from the edge of the cavity 8a.

The containment unit 4 can thus be rested on such flange 8b, during the above-mentioned previous step of stable insertion of the containment unit 4 into the complementarily-shaped recess that can be provided in the prosthesis: the flange 8b closes access to the chamber 4a and thus it is possible to obtain effective protection of the intermediate container 5 (accommodated in the chamber 4a) and/or of the unit 4 proper, thus preventing the resin or the adhesive spread inside the recess from affecting the other components in any way.

Positively, a segment of the flange 8a has an inclined ramp 8c (FIGS. 13 and 15), which ensures the correct resting of the containment unit 4 in the event of incorrect orientation of the pin 3 in the bone tissue.

The kit 1 can be supplied with one or more caps 8 without a ramp 8c and/or with one or more caps 8 provided with the ramp 8c.

Use of the kit according to the disclosure is the following.

As already anticipated, the kit 1 can be effectively used to secure a dental prosthesis to one of the maxillary or mandibular bones and, while remaining within the scope of protection claimed herein, such dental prosthesis can be any and therefore for example a simple dental crown, a dental implant or a dental bridge. However, the advantages of using the kit 1 according to the disclosure are more evident when the prosthesis replicates an entire dental arch, which is coupled to the body tissues of the edentulous patient at two or more pins 3, conveniently inserted into the gums. Use of the kit 1 is therefore described below, with particular reference to such application, but it is evident that the modes of use, and the scope of protection claimed, are understood to be extended to different scopes of application as well.

In more detail therefore, it should be noted that the container 5 is previously accommodated in the chamber 4a of the unit 4 (or, preferably, the container 5 and the unit 4 can be supplied already associated in this manner). Furthermore, the cap 8 is previously accommodated in the receptacle 5a (or again, preferably, the kit 1 can be supplied with the cap 8, the container 5 and the unit 4 already associated in this manner). The assembly made up of the cap 8, the container 5 and the unit 4 (as many assemblies of this type will be used as there are pins 3) is then associated with the pin 3, which was previously inserted into the respective gum seat.

More precisely, each head 3a of each pin 3 can be associated, by elastic forcing, with a corresponding cap 8, which to this end internally defines the cavity 8a.

As has been seen in the foregoing pages, such intermediate condition makes it possible to make the unit 4 (with the intermediate container 5 inside it) integral with the prostheses, which to this end is pressed against the pins 3 in order to then wait for the adhesive or resin to take effect. Once such activity is completed, the cap 8 is removed and one can proceed with the subsequent steps, while the container 5 remains inside the chamber 4a.

Therefore, the heads 3a are now associated, by elastic forcing, with a corresponding shell 2, which to this end internally defines the complementarily-shaped compartment 2a.

As has already been highlighted, the choice to shape the heads 3a like an equatorial region of a sphere is found to be of maximal interest, since, while waiting to receive the prosthesis, it reduces space occupation in the mouth and therefore discomfort for the patient.

The installation is then completed by grasping the prosthesis and pressing it against the pins 3 (which were previously aligned with the containers 5), thus causing the insertion (for example by elastic forcing) of each shell 2 into the respective receptacle 5a of the containers 5 (thus obtaining the cited mating configuration), which is already accommodated, as has been seen, in the units 4 which in turn are integrally inserted into the niches of the prosthesis. Entirely equivalently, one can first insert the shell 2 into the container 5, in order to then associate the pins 3 with the assembly formed by the shell 2, the container 5 and the unit 1, in order to then press against the prosthesis.

As has been seen, the mating obtained between the units 4 and the containers 5 also defines a spherical mating between these: when installation is complete, this allows a relative rotation, in any direction and at least by a few degrees (up to the limit value of inclination $\alpha$, where as has been seen the means of arrest are activated).

In more detail, at least the portion 5b extends coaxially from the end face 5d and therefore it is also coaxial to the rounding of the body 5c: following the insertion of the intermediate container 5 into the respective unit 4, during the rotation ensured by the spherical mating the body 5c slides against the unit 4 proper.

Such possibility of rotation ensures many advantages.

First of all in fact, when a prosthesis that simulates the entire dental arch is coupled to only two pins 3, the peculiar mode of coupling obtained by way of the kit 1 according to the disclosure and the spherical matings that are defined in particular guard against the danger of breakage or unseating, following the onset of stresses on the shells 2 (as conversely happens with conventional solutions, for example during chewing or during installation).

In fact, even if the prosthesis (U-shaped) behaves like a lever, determining the onset of stresses, while these are effectively not discharged with the rigid couplings of conventional solutions, in the kit 1 these simply cause the relative rotation between the units 4 and the containers 5, with no other negative consequences, like the breakage or the disengagement, even partial, of the prosthesis.

The kit 1 is found to be maximally effective even when the prosthesis is anchored to a larger number of pins 3 (in this case, usually four or more), which are not mutually parallel (for example owing to errors during the procedure to apply them), or in any case when their alignment does not coincide with the intended one and with respect to which the prosthesis was made.

In such cases in fact, in conventional solutions it is necessary to force the coupling in order to obtain the installation of the prosthesis, and this causes pain to the patient, and likewise places excessive and unnatural force on the tissues surrounding the pins 3, sometimes leading to the premature loss thereof.

Conversely, by using the kit 1, in the event of incorrect alignment or orientation of one or more pins 3 and of the respective shells 2, when the prosthesis is pressed against the gums in order to complete the coupling, the relative rotation between the units 4 and the containers 5 (freely allowed by the spherical mating) automatically occurs, with the latter rotating the shells 2 about the heads 3a until the misalignment is compensated and therefore obtaining in any case an optimal anchoring of the prosthesis to the pins 3, without trauma or discomfort for the patient.

Finally it has been found that the cap 8 (with or without a ramp 8c) offers further practical advantages during the preliminary step of stable insertion of the containment unit 4 into the complementarily-shaped recess that can be provided in the prosthesis.

In practice it has been found that the kit according to the disclosure fully achieves the set aim, since the use of the intermediate container, accommodatable in the at least partially complementarily-shaped chamber provided in the containment unit until a mating configuration is defined, with a curved surface hump of the container which is arranged in contact with at least one complementarily-shaped curved surface region of the unit, in order to define a spherical mating between the container and the unit, makes it possible to provide a dental technology kit that ensures an optimal anchoring of a prosthetic element to one or more pins.

The disclosure, thus conceived, is susceptible of numerous modifications and variations. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The invention claimed is:

1. A dental technology kit, for coupling a dental prosthesis to a bone tissue, the kit comprising:
   at least one shell that defines a compartment configured to connect with a protruding head of a pin configured to be anchored, directly or indirectly, to the bone tissue;
   at least one containment unit, configured to be stably inserted into the prosthesis; and
   an intermediate container that defines internally a receptacle of shape at least partially complementary to said shell, said intermediate container being accommodatable in an at least partially complementarily-shaped chamber provided in said containment unit until a mating configuration is defined, in said mating configuration at least one curved surface hump of said intermediate container constituted by at least one portion of a spherical cap, accommodated in said chamber, being received in at least one complementarily-shaped curved surface recess, which is defined internally by said containment unit, in order to define, at least in said mating configuration, a spherical mating between said intermediate container and said containment unit, wherein said intermediate container is closed at one end by a respective end face, and delimits said receptacle, said at least one portion of said spherical cap extending coaxially from said end face, on an opposite side with respect to said receptacle.

2. The kit according to claim 1, wherein said intermediate container is constituted by a rounded tubular body, and delimiting, with an inner surface of said rounded tubular body, said receptacle.

3. The kit according to claim 2, wherein said rounded tubular body is passed through by at least one through longitudinal slot, in order to increase elastic deformability of said intermediate container.

4. The kit according to claim 2, wherein said shell is passed through by at least one longitudinal split, in order to increase elastic deformability of said shell.

5. The kit according to claim 4, wherein said rounded tubular body and/or said shell respectively have a plurality of said slots and/or of said splits, equally distributed.

6. The kit according to claim 1, further comprising means of arrest for arresting a relative rotation, permitted by said spherical mating, between said containment unit and said intermediate container, said means of arrest being automatically activatable, at least in said mating configuration, upon reaching a predefined limit value of inclination assumed by said unit with respect to said intermediate container, or vice versa.

7. The kit according to claim 6, wherein said means of arrest comprise a circumferential ridge, protruding internally from the side wall of said containment unit, which delimits said chamber, in said mating configuration, and upon reaching said limit value, a portion of a shoulder provided externally on said intermediate container being brought to rest on a corresponding part of said ridge, in order to automatically arrest the relative rotation between said containment unit and said intermediate container.

8. The kit according to claim 1, wherein said shell and said intermediate container are made of a material chosen from between a biocompatible metallic material and a polymeric material.

9. The kit according to claim 1, wherein said pin and said containment unit are made of a biocompatible metallic material.

10. A dental technology kit for coupling a dental prosthesis to a bone tissue, the kit comprising:
   a pin comprising an elongated shank configured to be anchored directly or indirectly to the bone tissue, said pin forming a protruding head with an end hump;
   at least one shell that defines a compartment configured to connect with said protruding head of said pin, said protruding head being shaped complementary to said compartment of said at least one shell, configured to accommodate said protruding head in said compartment;
   at least one containment unit configured to be stably inserted into the prosthesis; and
   an intermediate container that defines internally a receptacle of shape at least partially complementary to said shell, said intermediate container being accommodatable in an at least partially complementarily-shaped chamber provided in said containment unit until a mating configuration is defined, in said mating configuration at least one curved surface hump of said intermediate container constituted by at least one portion of a cap, accommodated in said chamber, being received in at least one complementarily-shaped curved surface recess, which is defined internally by said containment unit, in order to define, at least in said mating configuration, a spherical mating between said at least one portion of said cap of said intermediate container and at least one complementarily-shaped curved surface recess of said containment unit, wherein said intermediate container is closed at one end by a respective end face, and delimits said receptacle, said at least one portion of said cap extending coaxially from said end face, on an opposite side with respect to said receptacle.

11. The kit according to claim 10, wherein said protruding head is contoured as an equatorial region of a sphere, said protruding head being shaped complementary to said compartment of said at least one shell, configured to accommodate said protruding head in said compartment by elastic forcing.

12. A dental technology kit, for coupling a dental prosthesis to a bone tissue, the kit comprising:
- at least one shell that defines a compartment configured to connect with a protruding head of a pin configured to be anchored, directly or indirectly, to the bone tissue;
- at least one containment unit, configured to be stably inserted into a complementarily-shaped recess provided in the prosthesis;
- an intermediate container that defines internally a receptacle of shape at least partially complementary to said shell, said intermediate container being accommodatable in an at least partially complementarily-shaped chamber provided in said containment unit until a mating configuration is defined, in said mating configuration at least one curved surface hump of said intermediate container, accommodated in said chamber, being arranged in contact with at least one complementarily-shaped curved surface region of said unit, in order to define, at least in said mating configuration, a spherical mating between said intermediate container and said unit; and
- at least one cap, which replicates a shape of said at least one shell and has internally a respective cavity, which replicates a shape of said compartment, for its temporary association with said pin and with said intermediate container, with said intermediate container accommodated in said chamber of said containment unit, during a preliminary step of stable insertion of said containment unit into a complementarily-shaped recess that can be provided in the prosthesis.

13. The kit according to claim 12, wherein said cap has an ancillary circumferential flange, which protrudes externally from the edge of said cavity, in order to support said containment unit during the preliminary step of stable insertion of said containment unit into the complementarily-shaped recess that can be provided in the prosthesis, and consequently protect said intermediate container and/or said containment unit.

14. The kit according to claim 13, wherein a segment of said flange has an inclined ramp, for the correct resting of said containment unit in the event of incorrect orientation of said pin in the bone tissue.

* * * * *